United States Patent [19]

Kloss

[11] 4,417,273
[45] Nov. 22, 1983

[54] VIDEO PROJECTION SYSTEM

[75] Inventor: Henry E. Kloss, Cambridge, Mass.

[73] Assignee: Kloss Video Corporation, Cambridge, Mass.

[21] Appl. No.: 336,727

[22] Filed: Jan. 4, 1982

[51] Int. Cl.³ .............................................. H04N 9/31
[52] U.S. Cl. ...................................... 358/60; 358/237
[58] Field of Search ................... 358/60, 64, 242, 254, 358/237

[56] References Cited

U.S. PATENT DOCUMENTS 2,287,307  6/1942  Herbst ................................. 358/254
4,358,792 11/1982  Domoleczny et al. .............. 358/254

FOREIGN PATENT DOCUMENTS 560153  3/1944  United Kingdom .
722346  1/1955  United Kingdom .
1508365  4/1978  United Kingdom .

*Primary Examiner*—Richard Murray
*Attorney, Agent, or Firm*—Schiller & Pandiscio

[57] ABSTRACT

A portable video image projection system is disclosed. The system is of the type which processes a video signal representative of a video image so as to provide a processed video signal, and includes at least one optical projection device responsive to the processed video signal for forming and projecting an image-forming beam of light along an optical axis so as to provide the video image on a substantially vertical viewing surface at a focal plane spaced a predetermined distance from the system along the axis. The system further comprises (1) a cabinet for supporting the projection device so as to project initially the image-forming beam in a substantially upward direction through an upper, open portion of the cabinet, and (2) a top including a specularly light reflective surface disposed to face the projection device. The top is dimensioned and movable between a first position wherein the top serves as a closure for the upper portion of said cabinet, and a second position wherein the light reflective surface is disposed to fold the optical axis so as to reflect the beam in a substantially horizontal direction.

In accordance with another aspect of the invention an improved portable video image projection system is provided by a video image projection system of the type which projects a focussed image onto a light reflective surface for viewing the image, wherein the system further comprises a positioning device, supported by the system, for setting the position of the projection means relative to the light reflective surface so that the focussed image is congruent with the surface. The positioning device provides a first pair of directional light beams intersecting at a first intersection point at a fixed distance from the system and in the focal plane of the focussed image, and a second pair of directional light beams intersecting at a second point at the fixed distance and in the focal plane.

10 Claims, 4 Drawing Figures

VIDEO PROJECTION SYSTEM

The present invention generally relates to video projection systems, and more particularly to a portable video image projection system.

A common type of current commercial video image projection system generally includes a projection unit supporting three projection tubes, each for forming and projecting a video image in one of the primary colors onto a video screen typically furnished with the unit. The three tubes are each supported so as to project the image ultimately along a horizontal optical axis onto the screen where the three images are registered to form a color image. In many such systems the nature of the tubes are such that the maximum intensity of light emission from the tubes is relatively low. Consequently, the screen preferably is curved in a concave manner so as to maximize reflection of light back to a viewer sitting in front of the screen. Also, it is usually necessary to view the image in a darkened room to obtain sufficient image contrast. Even in a darkened room, it is difficult to view the image on the screen, as the angle of view from the direct, on-axis view (i.e., generally parallel to the projection axis of the unit) is increased. At the time of installation of a curved viewing screen, accurate positioning of the unit with respect to the screen is necessary to maintain the proper focus and registration of the primary color images on the screen.

With the introduction of the new projection tubes of the type now being sold, for example, by the present assignee, in the Kloss Novabeam Video Projection System, a much more intense image can be maintained thereby substantially eliminating the need to view the image (1) on a curved screen, or (2) in a darkened room.

However, many of the presently commercially available systems are still sold with a screen, which in turn requires precise positioning when installed so that the projection unit and screen should not be moved.

It is an object of the present invention to substantially reduce or overcome the problems associated with the prior art.

More particularly, it is an object of the present invention to provide a video image projection system which can be used with any light reflective surface, such as a flat screen or wall.

Another object of the present invention is to provide a portable video image projection system which easily can be carried from location to location and positioned in its correct orientation with respect to a viewing surface.

And another object of the present invention is to provide a portable video image projection system which is compact and can easily be stored as a single unit.

And yet another object of the present invention is to provide a portable video image projection system including means for easily determining and setting the position of the projection system relative to the viewing surface so that the projected image is focussed and congruent with the viewing surface.

And still another object of the present invention is to provide a video image projection system which can be used in a well lit enviroment.

These and other objects of the present invention are achieved by a portable video image projection system of the type including means for processing a video signal representative of a video image so as to provide a processed video signal, and at least one optical projection device responsive to the processed video signal for forming and projecting an image-forming beam of light along an optical axis so as to provide the video image on a substantially vetical viewing surface at a focal plane spaced a predetermined distance from the system along the axis. The system further comprises portable cabinet means including (1) a cabinet for supporting the projection device so as to project initially the image-forming beam in a substantially upward direction through an upper, open portion of the cabinet, and (2) a top including a specularly light reflective surface disposed to face the projection device. The top is dimensioned and movable between a first position wherein the top serves as a closure for the upper portion of said cabient, and a second position wherein the light reflective surface is disposed to fold the optical axis so as to reflect the beam in a substantially horizontal direction.

In accordance with another aspect of the present invention an improved portable video image projection system is provided by a video image projection system including projection means for projecting a focussed image onto a light reflective surface for viewing the image, wherein the system further comprises positioning means, supported by the projection means, for setting the position of the projection means relative to the light reflective surface so that the focussed image is congruent with the surface. The positioning means includes means for providing a first pair of directional light beams intersecting at a first intersection point at a fixed distance from the system and in the focal plane of the focussed image, and means for providing a second pair of directional light beams intersecting at a second point at the fixed distance and in the focal plane. The means for providing the first and second pairs of beams are spaced from one another.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application which will be indicated in the claims.

For a fuller understanding of the nature and objects of the present invention, reference should be had to the following detailed description taken in connection with the accompanying drawings.

In the drawings the same numerals are used to designate like or similar parts.

Figure 2:
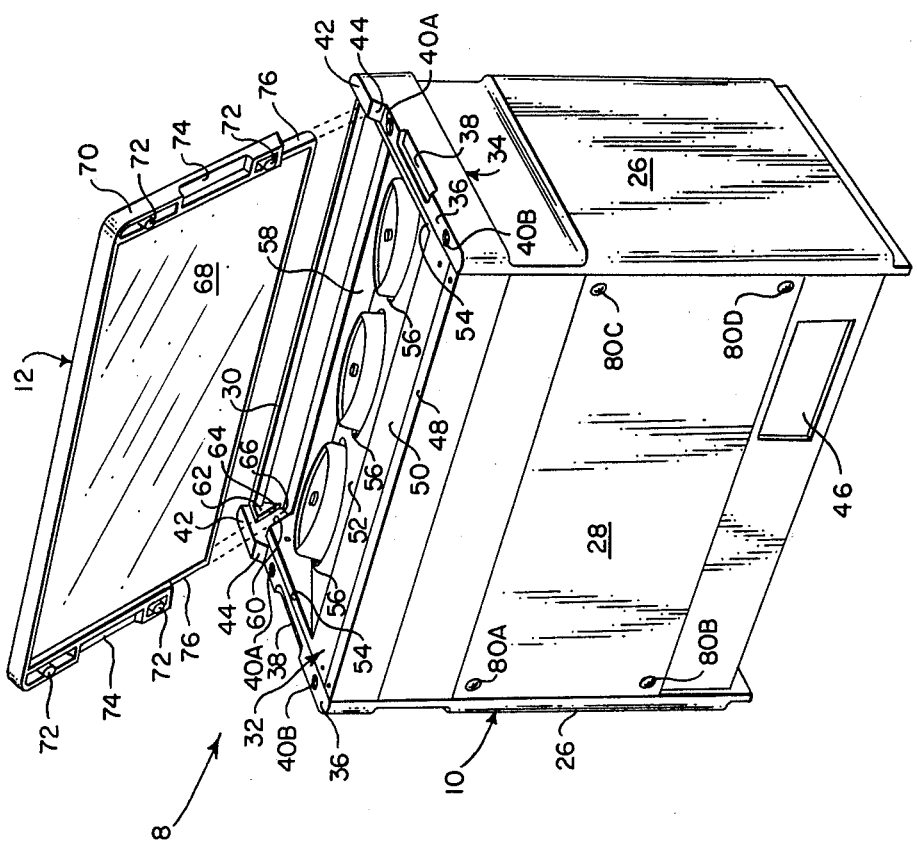
FIG. 2 is an exploded perspective rear view of the FIG. 1 embodiment with the top of the system removed from its first position of FIG. 1.
Figure 1:
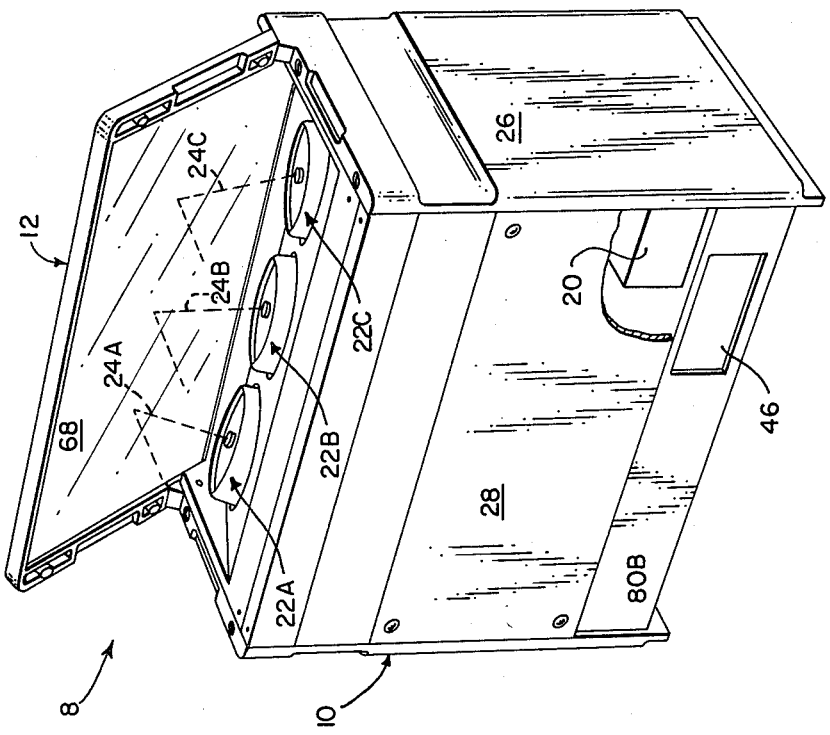
FIG. 1 is a perspective rear view of the preferred embodiment of the video image projection system of the present invention with the top of the system in a first position wherein the light reflective surface provided on the top folds the optical axes of the projection tubes.
Figure 3:
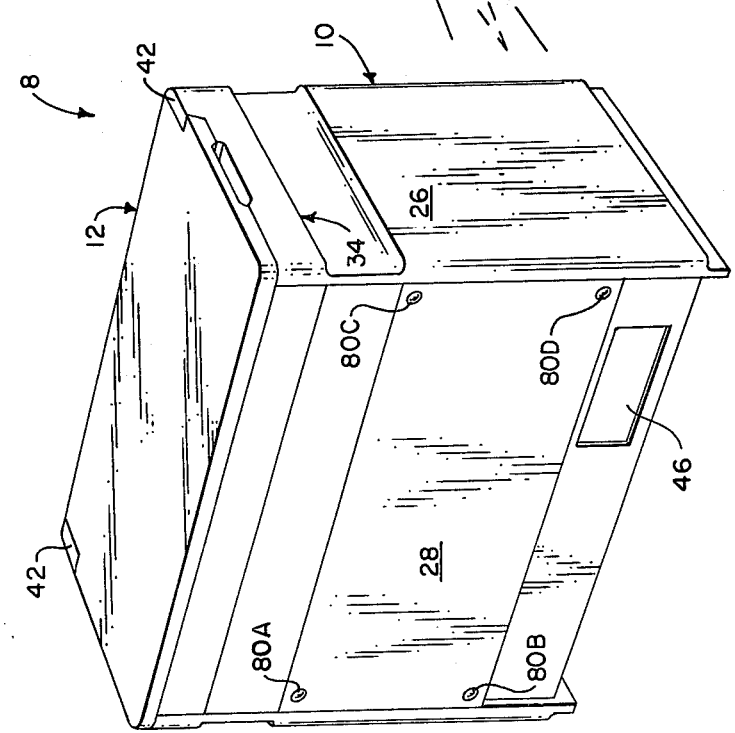
FIG. 3 is a perspective rear view of the FIG. 1 embodiment with the top of the system in a second position, wherein the top serves as a closure for the upper portion of the cabinet.

Referring to FIGS. 1-3, the preferred embodiment of the video image projection system 8 comprises portable cabinet means comprising the cabinet 10 and the top 12.

Cabinet 10 supports means generally indicated at 20, for processing a video signal representative of a video image so as to provide a processed video signal. As well known in the television and video image projection art, means 20 include means for receiving the original video signal, for example, from a TV tuner or a video tape recorder. Means 20 typically also include a demodulator and a sync stripper for isolating the video information signals, the audio information signal and the sync signal. Means 20 also include circuitry for processing the video and audio signals. The video information signal, once processed provides three processed video signals, each representative of the video image in a different primary color. Cabinet 10 also supports preferably three optical projection devices 22, each in the form of an image projection tube. Each of the tubes may be any video image projection tube of the type employed in video projection systems, but preferably provides a relatively intense beam of light, such as those types of tubes commercially sold by the present assignee in the Kloss Novabeam Video Projection System, and described in more detail in copending U.S. patent application Ser. No. 234,913 filed Feb. 17, 1981. Each tube is suitably connected to signal processing means 20 so as to receive the sync signal and a processed video signal representative of the video image in a respective one of the primary colors. Each tube is elongated in one direction and is supported in cabinet 10, by any suitable means such as supporting brackets (not shown) so that the tube is oriented in a substantially vertical direction and projects in response to the processed video and sync signals, the video image in an upward direction along optical axis 24 of the tube. This vertical orientation provides a more compact unit.

More specifically, tube 22A is positioned so as to form and project in an upward direction the video image of one primary color along optical axis 24A so that the video image is focused in an image plane at a predetermined distance along axis 24A. Similarly, tube 22B, preferably positioned adjacent tube 22A and tube 22C, are both positioned so as to respectively form and project in an upward direction the video image in the other two primary colors along corresponding optical axes 24B and 24C. Axes 24A, 24B and 24C are each folded by a specularly reflective surface provided on top 10 when the latter is in the position shown in FIG. 1 (as will be more evident hereinafter), so that the images are projected in a substantially horizontal direction to a viewing plane disposed at a distance from cabinet 10. Tubes 22A, 22B and 22C are oriented so that the corresponding optical axes 24A, 24B and 24C converge toward, and the three images are registered in and congruent with the same image plane.

Cabinet 10 also includes side panels 26, (one being shown in FIGS. 1, 2 and 3) rear panel 28, front panel 30 and top panel 32. The cabinet preferably includes means for easily lifting the system such as grooved handles 34 (only one being shown in FIGS. 1, 2 and 3), one formed in each side panel 26. The top edge of each side panel 26 includes rear portion 36 formed with recessed groove 38, approximately in the center of the panel, extending in from the exterior side of the panel. Rear portion 36 of the top edge of each panel 26 also includes registration apertures 40A and 40B, formed respectively in front of and behind recessed groove 38 (one between groove 38 and the front panel and the other between groove 38 and the rear panel 28). The top edge of each side panel 26 also includes raised portion 42 disposed substantially parallel to rear portion 36. Portion 42 joins rear portion 36 by inclined surface 44 between registration aperture 40A the front panel 30 of the cabinet. Rear panel 28 includes hole 46 for receiving the appropriate cables (not shown) for operating the system, such as the power cable, a remote control cable, cables for attaching the system to an antenna or a video tape recorder, etc. Top edge 48 of the rear panel is substantially flush with rear portion 36 of side panel 26 and upper rear surface 50 of top panel 32.

In addition to upper rear surface 50, top panel 32 is provided with the recessed ramped portion 52 extending between and below side portions 54. Ramped portion 52 is inclined from rear surface 50 toward front panel 30 and includes three apertures 56, each for receiving the upper portion of a respective projection tube 22 such that the uppermost part of each tube is position below top surfaces 50. The ramped portion 52 terminates at inclined portion 58 which extends from the lowermost part of ramped portion 52 up toward front panel 30. The side portions 54, flush with rear portion 36 of the top edge of the side panels, each extends toward the front panel, terminating at inclined surface 60 adjacent raised portion 42 of a respective side panel. Each inclined surface 60 (only one being shown in FIG. 2) extends in a downwardly direction at a predetermined angle and terminates at inclined portion 58. Front panel 30 includes extension 62 (one being shown in FIG. 2) adjacent each raised portion 42 of each side panel. Extension 62 includes inclined surface 64 opposite from and spaced parallel to the respective inclined surface 60 of the top panel so as to form a slot, indicated generally at 66, therebetween.

Top 12 of the system includes specularly reflective surface 68, such as a planar-surfaced mirror disposed within peripheral frame 70. Frame 70 includes registration pins 72 adapted to mate with registration apertures 40 when the cover is placed in the position shown in FIG. 3. A recessed groove 74 in the center of each side edge of the cover cooperates with the respective portion of recessed groove 38 of each side panel so that one can easily lift top 12 from its position in FIG. 3 and remove it from cabinet 10. Frame 70 is reduced in width at the front, as indicated generally at 76, so that when top 12 functions as a closure for the top of cabinet 10, raised portion 42 of each side panel extends on either side of reduced width portion 76 so that the top surface of each portion 42 is flush with the top surface of the top. The reduced width portion 76 of top 12 is adapted to slide in a snug fitting relation in slots 66 (as shown in FIGS. 1 and 2) so that specularly reflective surface 68 faces tubes 22 and folds optical axes 24 in a generally horizontal direction. Each slot 66 accordingly should be inclined so that reflective surface 68 is inclined in a plane approximately 45° with respect to the vertical.

Figure 4:
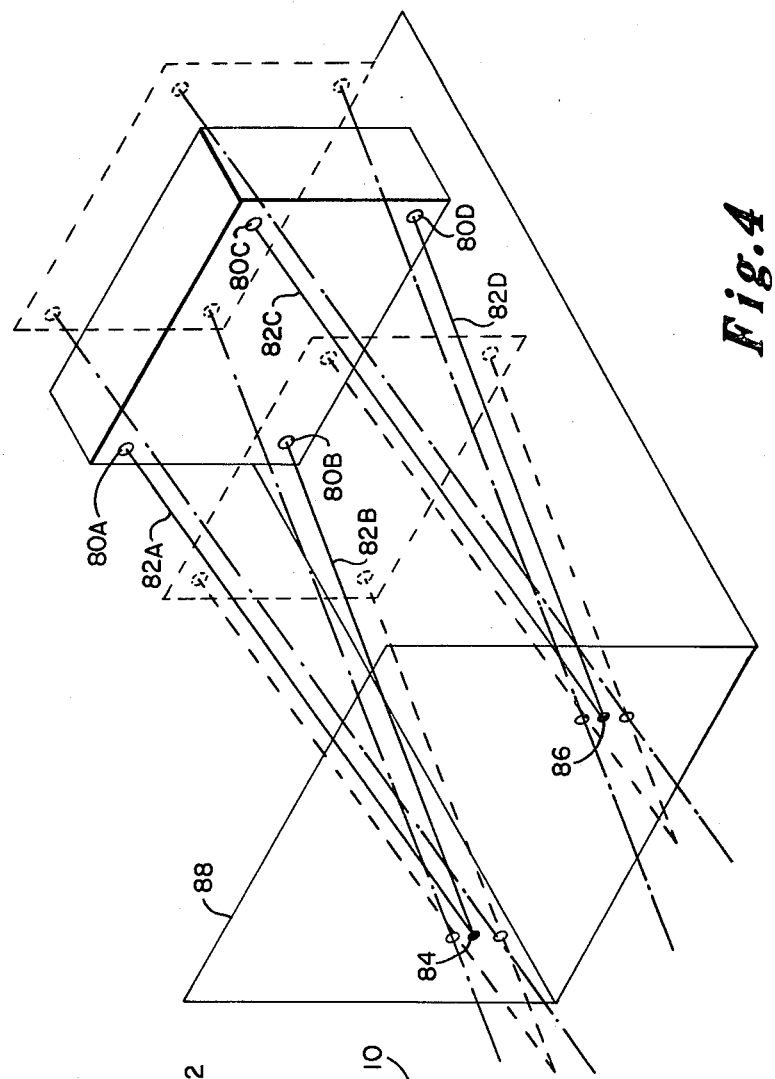
FIG. 4 is a schematic view of the FIG. 1 embodiment illustrating how the system is properly positioned relative to the viewing surface.

The system also includes positioning means preferably supported by cabinet 10 for setting the position of cabinet 10 and top 12 relative to a light reflective surface so that the focussed registered image is congruent with the light reflective surface. The positioning means preferably includes two pairs of light sources, separately energizable from means 20 and tubes 22. Sources 80A, 80B, 80C and 80D are preferably mounted on rear panel 28 in spaced relationship, such as the four corners of the panel. As best shown in the schematic illustration of FIG. 4, each source 80 is adapted to provide a thin, pencil-like, substantially collimated beam of light in a predetermind direction. Specifically, respective directional beams 82A and 82B provided by sources 80A and 80B intersect at a first location so as to form a single spot of light 84 in image plane 88 of the tubes 22, while sources 80C and 80D are oriented so that the respective directional beams 82C and 82D provided by these sources intersect at a second location so as to form a single spot of light 86 in image plane 88.

The use of sources 80 makes it simple to orient cabinet 10 and top 12 in the operating position shown in FIG. 1, by energizing sources 80. This can be done with a separate switch (not shown) provided on cabinet 10. If the cabinet and top are placed too close to the viewing surface, such as a screen or wall, light beams 82 will strike the reflective surface at four locations instead of two. If the cabinet and top are moved closer each pair of visible spots of light on the viewing surface will move further apart. As one moves the unit back from the viewing surface the visible spots should move closer together until beams 82A and 82B appear as single spot 84 and beams 82C and 82D appear as single spot 86. In a similar manner if the unit is too far from the viewing surface the beams will appear as four spots on the viewing surface. Moving away from the surface will result in the spots provided by beams 82A and 82B moving away from one another, and similarly the spots provided by beams 82C and 82D moving away from one another. Thus, moving the unit closer to the viewing surface will result in the two spots of each set converging to the point where the beams of each set appear as a single spot. It should be noted that where one set appear as one spot and the other as two spots, proper orientation can be obtained by rotating cabinet 10 and top 12 about a vertical axis so as to reduce the visible spots to two. When the visible spots are so reduced cabinet 10 and top 12 are in their proper orientation with respect to the viewing or display surface.

Cabinet 10 and cover 12 thus provide a compact unit which can easily be stored when not in use by resting the top on the cabinet as shown in FIG. 3. When it is desirable to use the system for viewing a video image, the system is appropriately positioned with respect to the viewing surface by energizing sources 80 and viewing the spots provided by beams 82 until only two spots 84 and 86 appear on the viewing surface. Top 12 can be removed from the top of the cabinet 10 and reduced portion 76 of top 12 inserted in slot 66 so that reflective surface 68 faces tubes 22. Sources 80 are deenergized and means 20 appropriately connected to a source of video signals.

Since certain changes may be made in the above apparatus without departing from the scope of the invention herein involved, it is intended that all matter contained in the above description or shown in the accompanying drawing shall be interpreted in an illustrative and not in a limiting sense.

I claim:

1. In a video image projection system including means for processing a video signal representative of a video image so as to provide a processed video signal, and at least one optical projection device responsive to said processed video signal for forming and projecting an image-forming beam of light along an optical axis so as to provide said video image on a viewing surface at a focal plane spaced a predetermined distance from said system along said axis, said system further comprising:
    portable cabinet means including (1) a cabinet for supporting said projection device so as to project said image-forming beam in a substantially upward direction through an upper, open portion of said cabinet, and (2) a top including a specularly light-reflective surface disposed to face said projection device, said top being so dimensioned and movable between a first position wherein said top serves as a closure for said upper portion of said cabinet, and a second position wherein said light reflective surface is disposed to fold said optical axis so as to reflect said beam in a substantially horizontal direction; and
    optical positioning means operable independently of said optical projection device and supported by said cabinet means for positioning said system so that said focal plane and said viewing surface may be brought into substantial congruence with one another.

2. A system according to claim 1, wherein said positioning means includes (a) means for generating a first pair of directional light beams so that said beams of said first pair intersect in said focal plane at a first location, and (b) means for generating a second pair of directional light beams so that said beams of said second pair intersect said focal plane in a second location spaced from said first location.

3. A system according to claim 1, wherein said specularly light reflective surface is substantially planar.

4. A system according to claim 3, wherein said light reflective surface is disposed on one side of said top so that said reflective surface faces said projection device when said top is in said first and second positions.

5. A system according to claim 1, wherein said cabinet includes means for supporting said top in said second position so as to maintain said image-forming beam in said substantially horizontal direction.

6. A system according to claim 5, wherein said means for supporting said top in said second position includes slot means formed in said cabinet for receiving said top so that said light reflective surface is disposed and maintained at a predetermined angle to said optical axis.

7. A system according to claim 6, wherein said light reflective surface is substantially planar, and said predetermined angle is substantially 45°.

8. A system according to claim 1, wherein said projection device includes three projection tubes responsive to said processed video signal, each of said tubes projecting along a corresponding separate optical axis, an image forming beam of light including said video image in a correspondingly different color, said tubes being supported by said cabinet so that each said tube projects said video image in said focal plane in registered relationship with the video images of the other tubes.

9. A system according to claim 8, wherein said light reflective surface is disposed in the optical axes of said three projection tubes so as to project said image-forming beam of each said tube onto said focal plane.

10. In a video image projection system including projection means for projecting a focussed image onto a light reflective surface for viewing said image, said system further comprising:
    positioning means supported by said projection means for setting the position of said projection means relative to said light reflective surface so that said focussed image is congruent with said surface, said positioning means including means for providing a first pair of directional light beams intersecting at a first intersection point at a fixed distance from said system and in the focal plane of said focussed image, and means for providing a second pair of directional light beams intersecting at a second point at said fixed distance and in said focal plane, said means for providing said first and second pairs of beams being spaced from one another.

* * * * *